(12) United States Patent
Kim et al.

(10) Patent No.: US 9,202,018 B2
(45) Date of Patent: Dec. 1, 2015

(54) METHOD AND SYSTEM FOR SHARING DIGITAL RIGHTS MANAGEMENT FILE BETWEEN PORTABLE TERMINALS

(75) Inventors: Jeong Hoon Kim, Gumi-si (KR); Jong Kerl Lee, Gumi-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1942 days.

(21) Appl. No.: 12/017,515

(22) Filed: Jan. 22, 2008

(65) Prior Publication Data

US 2008/0178001 A1 Jul. 24, 2008

(30) Foreign Application Priority Data

Jan. 23, 2007 (KR) .............................. 2007-0007095

(51) Int. Cl.
*G06F 21/10* (2013.01)
*H04L 29/06* (2006.01)

(52) U.S. Cl.
CPC ................ *G06F 21/10* (2013.01); *H04L 63/10* (2013.01); *G06F 2221/2107* (2013.01); *G06F 2221/2109* (2013.01); *H04L 2463/101* (2013.01)

(58) Field of Classification Search
CPC ............ G06F 21/10; G06F 2221/2107; G06F 2221/2109; H04L 63/10; H04L 2463/101
USPC ........................... 713/167; 726/26; 705/51–59
See application file for complete search history.

(56) References Cited

U.S. PATENT DOCUMENTS

| | | | |
|---|---|---|---|
| 2003/0145044 A1* | 7/2003 | Raivisto et al. ................ | 709/203 |
| 2005/0149340 A1* | 7/2005 | Murakami et al. ................ | 705/1 |
| 2006/0136339 A1* | 6/2006 | Kim et al. ........................ | 705/51 |
| 2006/0212943 A1* | 9/2006 | Kitazato et al. ................. | 726/26 |
| 2007/0219917 A1* | 9/2007 | Liu et al. ........................... | 705/59 |
| 2007/0260548 A1* | 11/2007 | Farrugia et al. ................ | 705/59 |
| 2008/0010501 A1* | 1/2008 | Bucher et al. ..................... | 714/6 |
| 2008/0103977 A1* | 5/2008 | Khosravy et al. ............... | 705/59 |
| 2008/0289044 A1* | 11/2008 | Choi ............................... | 726/26 |

FOREIGN PATENT DOCUMENTS

| | | | | |
|---|---|---|---|---|
| JP | 2004-227282 | 8/2004 | ............. | G06F 17/60 |
| KR | 2005-20165 | 3/2005 | ............. | G06F 17/00 |
| KR | 2006-46427 | 5/2006 | ............. | H04L 12/22 |
| KR | 2006-111328 | 10/2006 | ............. | G06Q 99/00 |
| KR | 2006-117769 | 11/2006 | ............. | G06Q 99/00 |
| WO | WO 2005/093989 | 10/2005 | ................ | H04L 9/00 |

OTHER PUBLICATIONS

Buhse, Willms, and Jan van der Meer. "The Open Mobile Alliance Digital Rights Management [Standards in a Nutshell]." Signal Processing Magazine, IEEE 24.1 (2007): 140-143.*
Messerges, Thomas S., and Ezzat A. Dabbish. "Digital rights management in a 3G mobile phone and beyond." Proceedings of the 3rd ACM workshop on Digital Rights Management. ACM, (2003): 27-28.*
Frikken, Keith, et al.; "Remote Revocation of Smart Cards in a Private DRM System;" Proceedings of 2005 Australasian Workshop on Grid Computing and E-Research; vol. 44.

* cited by examiner

*Primary Examiner* — Kari Schmidt
(74) *Attorney, Agent, or Firm* — Cha & Reiter, LLC

(57) ABSTRACT

Disclosed is a method and system for sharing a DRM file between portable terminals. The method includes selecting a DRM file stored in a memory by a transmitting terminal, extracting license information from the DRM file by the transmitting terminal, transmitting the license information to a receiving terminal by the transmitting terminal, checking if the receiving terminal acquires a license by the transmitting terminal, externally receiving the DRM file corresponding to the license by the receiving terminal, and reproducing the DRM file in synchronization with the receiving terminal by the transmitting terminal.

10 Claims, 9 Drawing Sheets

FIG. 3

| Content Encryption Object [178 bytes] | |
|---|---|
| Property | Value |
| File Position | 1138 (0x472) |
| Object ID | 2211B3FB-BD23-11D2-B4B7-00A0C955FC6E |
| Object Size | 178 (0xB2) |
| Type | "DRM" |
| Key ID | "7VUynQnO1kSIh5PA7asPfA==" |
| License URL | "http:/N2srvWM/registration.asp?content_guid={2FBD6156-75FA-4FF1-B2A0-8A7ADF57F7DC}" |
| Secret Data Size | 24 (0x18) |
| Secret Data | 0000 : E9 58 D2 C9 38 1C 1B 64-23 4B A5 4E BC 8D 6A C3   X  8       d#K N  j |
| | 0010 : 85 D7 7D F7 F2 FB 77 10 |
| Raw data dump | |
| Size | 178 (0xB2) |
| Data | <show> |

METHOD AND SYSTEM FOR SHARING DIGITAL RIGHTS MANAGEMENT FILE BETWEEN PORTABLE TERMINALS

CLAIMS OF PRIORITY

This application claims priority to an application entitled "METHOD AND SYSTEM FOR SHARING DIGITAL RIGHTS MANAGEMENT FILE BETWEEN PORTABLE TERMINALS," filed in the Korean Intellectual Property Office on Jan. 23, 2007 and assigned Serial No. 2007-0007095, the contents of which are incorporated herein by reference.

BACKGROUND OF THE INVENTION

1. Field of the Invention

The present invention relates generally to a method and system for sharing a digital rights management file between portable terminals and, more particularly, to a method and system for sharing a digital rights management file between portable terminals, which supports the portable terminals so that they can share and reproduce the digital rights management file during a connected call.

2. Description of the Prior Art

Digital Rights Management (hereinafter referred to as "DRM") technology provides a continuously management and protection of intellectual property rights of digital contents using encryption techniques. The DRM technology involves safely conveying various contents from a Content Provider (CP) to a user while preventing a user from illegally circulating the conveyed contents.

Such DRM technology makes it possible to protect information through the entire process covering the generation, distribution, use, and discard of digital contents, and enables a user to use digital contents according to the rights given to him/her and protect his/her rights for the digital contents off-line as well as on-line.

In order to use a content to which the DRM technology is applied (hereinafter referred to as "DRM content") in a portable terminal, a user of the portable terminal must access a content provider server providing the corresponding DRM content, and download the DRM content, metadata, and a license for the DRM content. Here, the metadata refers to data in which information on a DRM content is stored, and the license refers to data that contains a decryption key used for decrypting an encrypted content and specifies content use rights (e.g., number of times, period, etc.).

Once both the DRM content and license are stored in a portable terminal through such a process, the DRM content is available to the user. However, the user may use the DRM content within the limit of the content use rights specified in the license. The license may specify the content use rights by restricting the number of reproductions, the period of use, or the like. More specially, when the license restricts the number of reproductions, the DRM content cannot be reproduced any longer if the number of times that the user has reproduced the DRM content is equal to or greater than the allowed reproduction. That is, when the license restricts the period of use, the DRM content cannot be used any longer if the period of use of the DRM content, specified in the license, expires. Further, when a DRM content for which a license must be acquired is stored in a specific portable terminal, the DRM content is set up in such a manner that it cannot be transmitted to another portable terminal, and even if the DRM content may be transmitted, it is impossible to reproduce the DRM content in another portable terminal that receives the DRM content.

In general, music files, image files, etc. form the majority of DRM contents, and such DRM contents are more valuable when many users share them. That is, users of DRM contents have a strong tendency to strengthen ties and deepen understanding between people by allowing others to share their favorite music or image files. Thus, there is a strong need for a method of legally sharing DRM contents in line with the tendency of users thereof.

SUMMARY OF THE INVENTION

Accordingly, the present invention has been made to solve the above-mentioned problems occurring in the prior art and provides additional advantages, by providing a method and system for sharing a DRM file between portable terminals, which enables the portable terminal users to share the DRM file during a connected call.

In accordance with an aspect of the present invention, there is provided a method of sharing a DRM file between portable terminals, the method including: selecting the DRM file stored in a memory by a transmitting terminal; extracting license information from the DRM file by the transmitting terminal; transmitting the license information to a receiving terminal by the transmitting terminal; checking if the receiving terminal acquires a license by the transmitting terminal; externally receiving the DRM file corresponding to the license by the receiving terminal; and reproducing the DRM file in synchronization with the receiving terminal by the transmitting terminal.

In accordance with another aspect of the present invention, there is provided a method of sharing a DRM file between portable terminals, the method including: selecting the DRM file by a transmitting terminal; requesting a server to transmit a license corresponding to the DRM file to a receiving terminal by the transmitting terminal; transmitting the license to the receiving terminal by the server; externally receiving the DRM file corresponding to the license by the receiving terminal; and reproducing the DRM file in synchronization with the receiving terminal by the transmitting terminal after the receiving terminal completes receiving the DRM file.

In accordance with yet another aspect of the present invention, there is provided a system for sharing a DRM file between portable terminals, the system including: a transmitting terminal for extracting license information from an already stored DRM file to which DRM technology is applied, externally transmitting the license information, selectively externally transmitting the DRM file, and reproducing the DRM file during a connected call; and a receiving terminal for externally acquiring a license of the DRM file based on the license information, receiving the DRM file, and then reproducing the DRM file in synchronization with the transmitting terminal.

In accordance with still yet another aspect of the present invention, there is provided a system for sharing a DRM file between portable terminals, the system including: a server for providing at least one of a DRM file and a license defining a reproduction right of the DRM file; a transmitting terminal for requesting the server to externally transmit the license corresponding to the DRM file already stored therein, and reproducing the DRM file during a connected call; and a receiving terminal for receiving the license from the server, receiving a DRM file identical to the DRM file stored in the transmitting terminal, reproducing the DRM file in synchronization with the transmitting terminal during the connected call with the transmitting terminal.

BRIEF DESCRIPTION OF THE DRAWINGS

The above and other aspects, features and advantages of the present invention will be more apparent from the following detailed description taken in conjunction with the accompanying drawings, in which:

FIG. 3 is a view illustrating in detail the header of a DRM file according to an exemplary embodiment of the present invention;

DETAILED DESCRIPTION OF THE INVENTION

Figure 1:
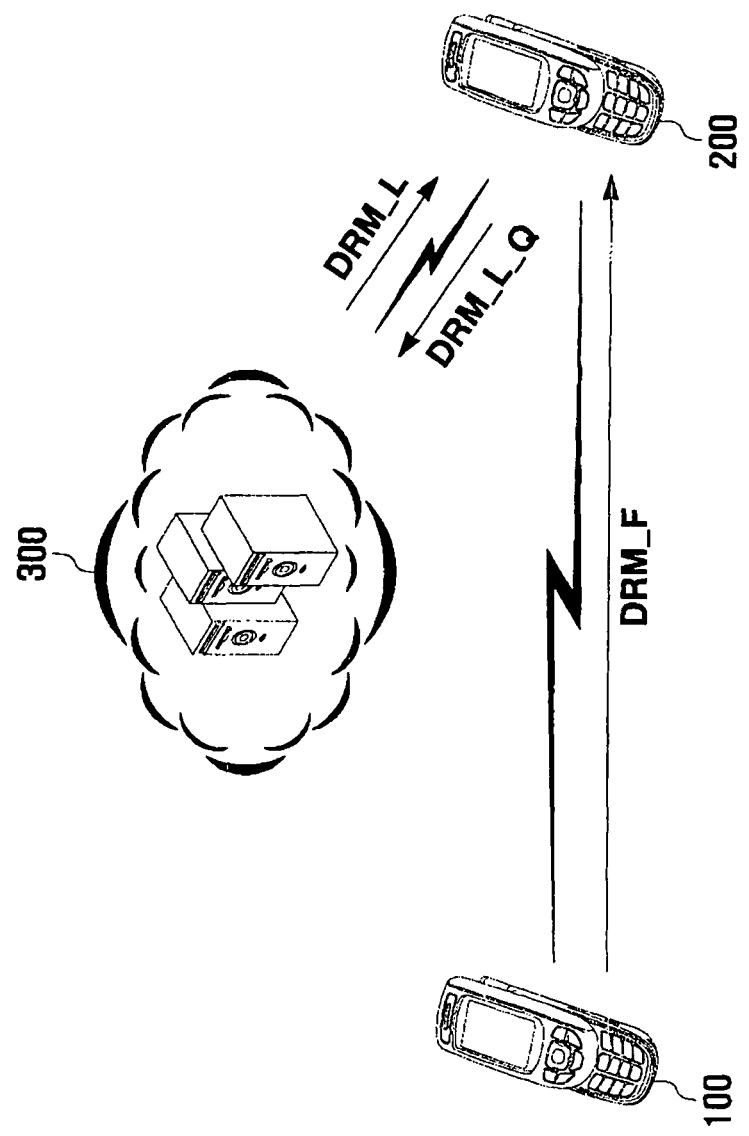
FIG. 1 is a view schematically illustrating the architecture of a system for sharing a DRM file between portable terminals according to an exemplary embodiment of the present invention.

Hereinafter, exemplary embodiments of the present invention will be described with reference to the accompanying drawings. The same reference symbols identify the same or corresponding elements in the drawings. For the purposes of clarity and simplicity, detailed descriptions of constructions or processes known in the art may be omitted to avoid obscuring the invention in unnecessary detail.

The present invention is described hereinafter with reference to block diagrams or flowcharts for illustrating apparatuses and methods for transmitting an event in a web-based system according to embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks. And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Prior to a detailed description of the present invention, it should be appreciated that a portable terminal of the present invention is a terminal capable of using DRM contents, and preferably includes all types of information communication equipment, multimedia equipment, and applications thereof, such as a game terminal, a mobile communication terminal capable of using an MMS or multi-mail service, a cellular phone, a wired/wireless telephone, a PDA (Personal Digital Assistance), a smart phone, an IMT-2000 (International Mobile telecommunication 2000) terminal, a UMTS (Universal Mobile Telecommunication Service) terminal, a DMB (Digital Multimedia Broadcasting) terminal, a notebook, a personal computer, a WCDMA (Wideband Code Division Multiple Access) terminal, a portable internet service terminal, etc.

Further, in the following description, the portable terminal will be divided into a transmitting terminal and a receiving terminal. However, the transmitting and receiving terminals as described herein are for the convenience of explanation only, and one terminal may serve as the transmitting and receiving terminals.

Further, in the following description, it will be assumed that a video call is connected when the transmitting and receiving terminals establish a call connection, but the present invention is not limited thereto. The inventive method and system for sharing a DRM file between portable terminals may be applied to a voice call as well as the video call, and in the case of the voice call, a DRM content is preferably formed by an audio file to be inserted as the background for the voice call. Further, in the case of the video call, a DRM content is preferably formed by at least one of an audio file and a video file including a still image and a moving picture.

FIG. 1 schematically illustrates the architecture of a system for sharing a DRM file between portable terminals according to an exemplary embodiment of the present invention.

Referring to FIG. 1, the system for sharing a DRM file between portable terminals according to this embodiment includes a transmitting terminal 100, a receiving terminal 200, and a server 300 for providing a DRM file DRM_F and a license DRM_L that defines use rights for reproducing the DRM file DRM_F. The DRM file sharing system further includes a mobile communication system for establishing a communication channel between the transmitting terminal 100, the receiving terminal 200, and the server 300.

In the DRM file sharing system according to this embodiment, after the transmitting terminal 110 and the receiving terminal 220 establish a call connection, the transmitting terminal 100 transmits information regarding a DRM file DRM_F stored in a memory thereof to the receiving terminal 200 so as to share the DRM file DRM_F with the receiving terminal 200 by enabling the receiving terminal 200 to acquire a license from the server 300. Thus, based on the transmitted information regarding the DRM file DRM_F, the receiving terminal 200 transmits a license request DRM_L_Q signal to the server 300, acquires the license for reproducing the DRM file DRM_F, and then reproduces the same DRM file DRM_F as that reproduced in the transmitting terminal 100.

Figure 2:
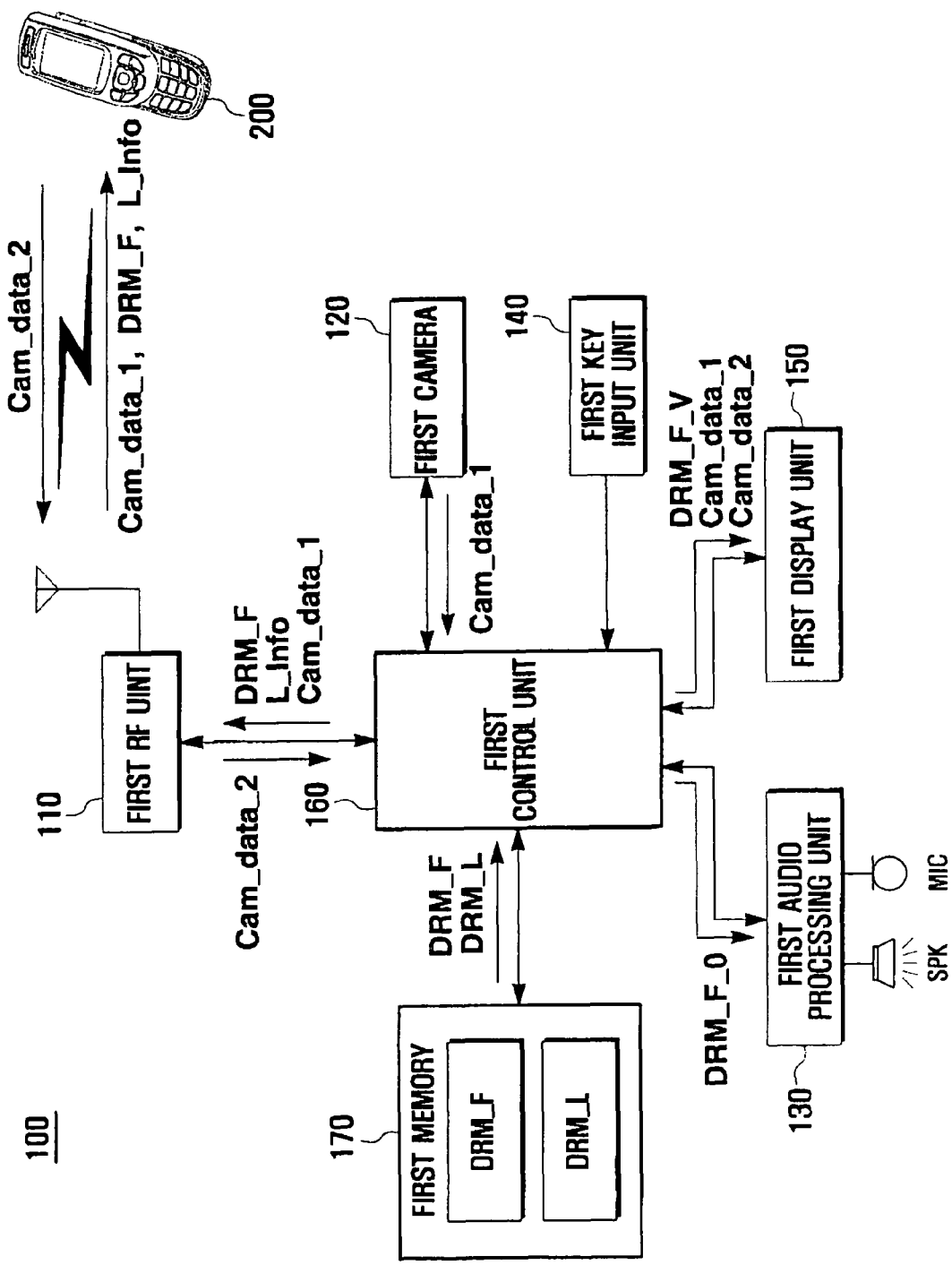
FIG. 2 is a block diagram schematically illustrating the structure of a transmitting terminal according to an exemplary embodiment of the present invention.

FIG. 2 schematically illustrates the structure of a transmitting terminal 100 according to an exemplary embodiment of the present invention, and signal flow between constituent elements of the transmitting terminal 100.

Referring to FIG. 2, the transmitting terminal 100 includes a first Radio Frequency (hereinafter referred to as "RF") unit 110, a first camera 120, a first audio processing unit 130, a first key input unit 140, a first display unit 150, a first memory 170, and a first control unit 160.

In operation, the first RF unit 110 wirelessly transmits user data to another external portable terminal, that is, a receiving terminal 200, or undertakes a series of communications regarding transmitting/receiving contents and control signals related to the contents through interworking with the aforementioned server 300. The first RF unit 110 includes an RF transmitter for up-converting the frequency of a transmitted signal and amplifying the transmitted signal, an RF receiver for low-noise amplifying a received signal and down-converting the frequency of the received signal, and others.

Particularly, the first RF unit 110 transmits a DRM file DRM_F stored in the first memory 170, license information L_Info, and first image data Cam_data_1 photographed by the first camera 120 to the receiving terminal 200, and receives second image data Cam_data_2 transmitted from the receiving terminal 200. Further, the first RF unit 110 may transmit audio signals collected by the first audio processing unit 130, and receive audio signals from the receiving terminal 200.

The first camera 120 photographs an image, receives the photographed image as a data signal, and generates the first image data Cam_data_1 by converting the received data signal into a digital data signal in cooperation with an encoder (not shown). The first image data Cam_data_1 output from the first camera 120 corresponds to image data converted from an image signal, and may change in size and pixel values so as to be displayed on the display unit 150 and transmitted to the receiving terminal 200.

The first audio processing unit 130 may include a microphone MIC for collecting audio signals necessary for a voice call with the receiving terminal 200 under the control of the first control unit 160, a speaker SPK for reproducing and outputting voices conveyed from the receiving terminal 200 under the control of the first control unit 160, and so forth. Further, the first audio processing unit 130 may reproduce and output a DRM audio file DRM_F_O from among DRM files stored in the first memory 170, and reproduce an audio signal which the first RF unit 110 externally receives.

The first key input unit 140 includes a plurality of input keys for inputting numerals and characters, and a plurality of function keys for setting various functions. The function keys may include direction, side and shortcut keys for conducting specific functions. Further, the first key input unit 140 conveys key signals input in connection with user settings and functional control for the transmitting terminal 100 to the first control unit 160.

Particularly, according to an exemplary embodiment of the present invention, the first key input unit 140 generates key signals for reproducing a DRM file DRM_F and key signals corresponding to control event signals for a DRM file DRM_F in the middle of reproduction, such as pause, stop, FF and REW signals, and conveys the generated key signals to the first control unit 160. Further, the first key input unit 140 generates key signals according to the key inputs necessary for a video call with the receiving terminal 200, such as key inputs corresponding to control signals for a call connection and camera activation, key signals according to key inputs necessary for a voice call, key signals according to key inputs necessary for selecting a DRM file DRM_F stored in the first memory 170, etc., and conveys the generated key signals to the first control unit 160.

The first display unit 150 displays various menus of the transmitting terminal 100, information input by a user, or information to be provided to the user. Particularly, when a DRM file DRM_F contains a video file, the first display unit 150 reproduces and displays the corresponding DRM video file DRM_F_V. Further, the first display unit 150 may display the first image data Cam_data_1 photographed by the first camera 120, and the second image data Cam_data_2 received from the receiving terminal 200. Here, the first display unit 150 may simultaneously display the first image data Cam_data_1 and the second image data Cam_data_2 in separate regions of one and the same screen, and may also overlappingly display them in a specific region of the screen. Further, the first display unit 150 may display a menu screen necessary for the transmitting terminal 100 to perform a video call and a menu screen necessary for the transmitting terminal 100 to perform a voice call, and display a specified image corresponding to a call connection process. The first display unit 150 may be formed by a Liquid Crystal Display (hereinafter referred to as "LCD"), and may be included in input means when the LCD is in the form of a touch screen.

The first memory 170 stores application programs necessary for operating functions according to embodiments of the present invention, DRM files DRM_F, licenses DRM_L that define reproduction rights for the DRM files DRM_F respectively, user data created by a user, etc. When a DRM file DRM_F is transmitted in real time to according to a streaming service, the first memory 170 may function to buffer the DRM file DRM_F as much as specified. This first memory 170 may be largely divided into a program area and a data area.

The program area stores an Operating System (OS) necessary for booting the transmitting terminal 100, an application program necessary for reproducing a DRM file DRM_F, application programs necessary for operating functions of the transmitting terminal 100, such as a camera function, a sound reproduction function, an image or moving picture reproduction function, etc. When each of these functions is activated at the request of a user, the transmitting terminal 100 provides each function by using a corresponding application program under the control of the first control unit 160.

The data area is an area in which data generated in the course of using the transmitting terminal 100 are stored. That is, the data area may store DRM files DRM_F and licenses DRM_L downloaded from the server 300, user data regarding the aforementioned various other functions, such as photographed images or moving pictures according to the camera function, phonebook data and audio data, information corresponding to corresponding contents or user data, and the like.

The first control unit 160 controls the overall operation of the transmitting terminal 100 and signal flow between internal blocks of the transmitting terminal 100. The first control unit 160 may include modem and codec functions.

Particularly, the first control unit 160 controls signal transmission/reception necessary for a call connection with the receiving terminal 200, that is, a video or voice call connection with the receiving terminal 200, and may control the activation of modem and codec functions necessary for a corresponding call connection. More specifically, the first control unit 160 may further include an image codec for encoding the first image data Cam_data_1 collected by controlling the first camera 20 when the transmitting terminal 100 opens a video call, and a multiplexer/demultiplexer MUX/DEMUX for combining the first image data Cam_data_1 necessary for the video call and audio signals after the audio signals are collected through the first audio processing unit 130. The first control unit 160 may perform a video call connection and a video call based on H.323 and H.324M protocols.

Meanwhile, in order to share a DRM file DRM_F with the receiving terminal 200 with which a video call or a voice call is connected, the first control unit 160 may control a DRM file DRM_F stored in the first memory unit 170 to be transmitted to the receiving terminal 200, and extract license information L_Info, which is necessary for reproducing the DRM file DRM_F in the receiving terminal 200, from the DRM file DRM_F or a license DRM_L stored in the first memory 170 and convey it to the receiving terminal 200. More specifically, the first control unit 160 may examine the header of the DRM file DRM_F, as illustrated in FIG. 3, extract a license URL (Uniform Resource Locator), a Key ID and Secret Data from the header of the DRM file DRM_F, and generate a message containing the license URL, that is, license information DRM_L. Upon generating the license information DRM_L, the first control unit 160 transmits the license information L_Info to the receiving terminal 200, thereby enabling the receiving terminal 200 to acquire a license DRM_L necessary for reproducing the DRM file DRM_F.

However, the first control unit 160 may also transmit the license DRM_L corresponding to the DRM file DRM_F directly to the receiving terminal 200 by accessing the server 300 and acquiring the license DRM_L through purchasing, etc. With regard to this, the first control unit 160 may use the license information L_Info for transmitting a request for the license DRM_L corresponding to the DRM file DRM_F to the server 300.

As mentioned above, after the transmitting terminal 100 of the present invention connects a video call or a voice call with the receiving terminal 200, it may extract license information L_Info corresponding to a DRM file DRM_F stored in the first memory 170 and transmit the extracted license information L_Info to the receiving terminal 200 in order to share the DRM file DRM_F with the receiving terminal 200. Further, the transmitting terminal 100 may also acquire a license DRM_L corresponding to the license information L_Info from the server 300 and transmit it directly to the receiving terminal 200. As far as the DRM file DRM_F to be shared with the receiving terminal 200 is concerned, the transmitting terminal 100 may transmit the DRM file DRM_F stored in the first memory 170 directly to the receiving terminal 200 or request the server 300 to transmit the DRM file DRM_F to the receiving terminal 200 according to the transmitting terminal's choice. With regard to this, a detailed description will be given later in connection with a DRM file sharing method.

Figure 4:
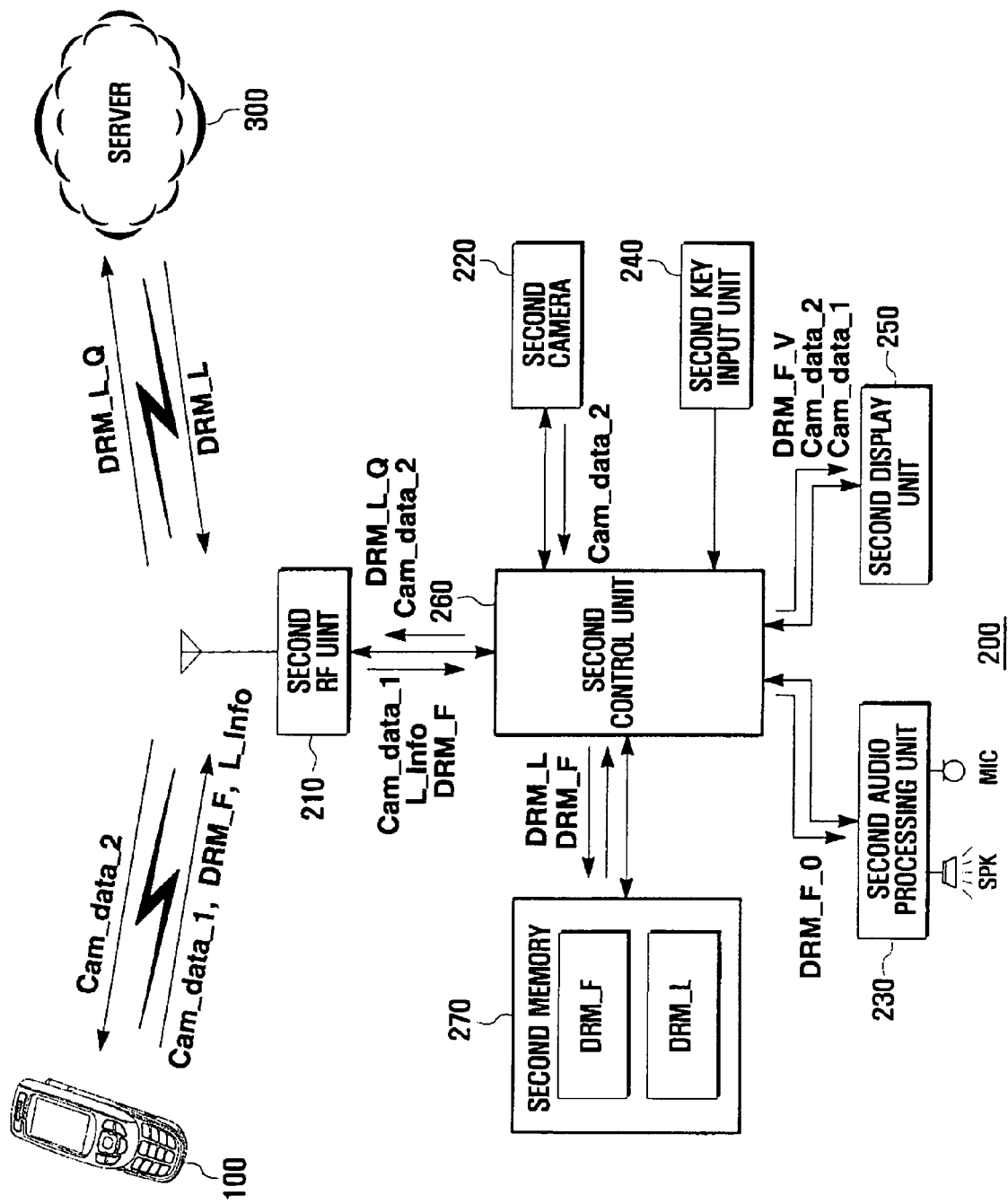
FIG. 4 is a block diagram schematically illustrating the structure of a receiving terminal according to an exemplary embodiment of the present invention.

FIG. 4 schematically illustrates the structure of a receiving terminal according to an exemplary embodiment of the present invention.

Referring to FIG. 4, the receiving terminal 200 according to this embodiment includes a second RF unit 210, a second camera 220, a second audio processing unit 230, a second key input unit 240, a second display unit 250, a second memory 270, and a second control unit 260.

To avoid redundancy, parts of the receiving terminal 200, which overlap with to those of the transmitting terminal 100, will not be described in detail because they have been already described in conjunction with the transmitting terminal 100.

The second RF unit 210 establishes a traffic channel for a call connection with the transmitting terminal 100, receives audio signals, the first image data Cam_data_1, a DRM file DRM_F and license information L_Info transmitted by the transmitting terminal 100, and conveys them to the second control unit 260. Further, the second RF unit 210 establishes a communication channel with the server 300, transmits a license request DRM_L_Q signal to the server 300 over the communication channel, acquires a license corresponding to the license information L_Info from the server 300, and conveys the acquired license to the second control unit 260. The second RF unit 210 transmits audio signals collected by the second audio processing unit 230 to the transmitting terminal 100 when a voice call is connected, and transmits the second image data Cam_data_2 photographed by the second camera 220 and the audio signals to the transmitting terminal 100 when a voice call is connected. The second RF unit 210 may transmit/receive control signals necessary for a video call, a voice call, DRM file sharing and others.

The second audio processing unit 230 includes a speaker SPK for reproducing audio signals received from the transmitting terminal 100, and a microphone MIC for collecting necessary audio signals during a call. The second audio processing unit 230 may reproduce and output a DRM audio file DRM_F_O that is included in a DRM file DRM_F received from the transmitting terminal 100 or the server 300, and other audio signals.

The second key input unit 240 generates key signals according to key inputs necessary for a call connection with the transmitting terminal 100 and key inputs necessary for sharing a DRM file DRM_F, and conveys the generated key inputs to the second control unit 260. For example, the second key input unit 240 generates key signals according to key inputs for controlling the second camera 220, activating the second display unit 250, selecting a menu item, and selecting a file stored in the second memory 270, key inputs of a call start button for a call connection and a call end button, etc.

The second display unit 250 provides a screen necessary for a call connection, a screen necessary for reproducing a video file when a DRM file DRM_F is shared, and other screens necessary for controlling the receiving terminal 200. More specially, when a video call is connected, the second display unit 250 displays the second image data Cam_data 2 photographed by the second camera 220, the first image data Cam_data_1 received from the transmitting terminal 100, images according to the reproduction of a DRM video file DRM_FMV included in the DRM file DRM_F, a menu screen for terminal control, key signals according to key inputs, etc. Similar to the first display unit 150, the second display unit 250 may be input means when in the form of a touch panel.

The second memory 270 may store application programs necessary for operating and controlling the receiving terminal 200, data generated in the course of operating the receiving terminal 200, user information, phonebook data and so forth.

Particularly, the second memory 270 may store a DRM file DRM_F received from the transmitting terminal 100 or the server 300, and store a license DRM_L file defining a reproduction right for the DRM file DRM_F after receiving it from the server 300 or the transmitting terminal 100. The stored DRM file DRM_F and license DRM_L are activated under the control of the second control unit 260.

The second control unit 260 controls the signal flow according to the overall operation of the receiving terminal 200. Particularly, the second control unit 260 performs a series of operations related to the acquisition of a DRM file DRM_F to be shared with the transmitting terminal 100, the acquisition of a license for reproducing the DRM file DRM_F, the reproduction of the DRM file DRM_F, etc. More specifically, when the receiving terminal 200 receives license information L_Info which the transmitting terminal 100 additionally transmit in order to share a DRM file DRM_F, the second control unit 260 attempts to access the server 300 by using a license URL included in the license information L_Info, performs the procedures for acquiring a license DRM_L from the server 300, for example, a billing and validation procedure, upon accessing the server 300, and stores the acquired license DRM_L in the second memory 270. In contrast with this, when transmitting a license DRM_L necessary for reproducing the DRM file DRM_F directly to the receiving terminal 200, the second control unit 260 stores the license DRM_L in the second memory 270, and then reproduces the DRM file DRM_F by making a reference to the stored license DRM_L. A DRM file sharing method for the receiving terminal 200 will be described later.

The server 300 provides portable terminals, that is, the transmitting and receiving terminals 100 and 200, with a DRM file DRM_F and a license DRM_L for reproducing the DRM file DRM_F, and charges for them. When the transmitting terminal 100 is to share a DRM file DRM_F with the receiving terminal 200, the server 300 may transmit a license DRM_L necessary for reproducing the DRM file DRM_F to the receiving terminal 200 via the transmitting terminal 100 or directly to the receiving terminal so that the receiving terminal 200 can acquire the license DRM_L. Further, when the DRM file DRM_F is not already stored in the receiving terminal 200, the server 300 may transmit the DRM file DRM_F to the receiving terminal 200.

In the foregoing, the respective constituent elements of the DRM file sharing system according to an exemplary embodiment of the present invention have been described. Reference will now be made in details to a method of sharing a DRM file between portable terminals according to an exemplary embodiment of the present invention, with reference to the accompanying drawings.

Figure 5:
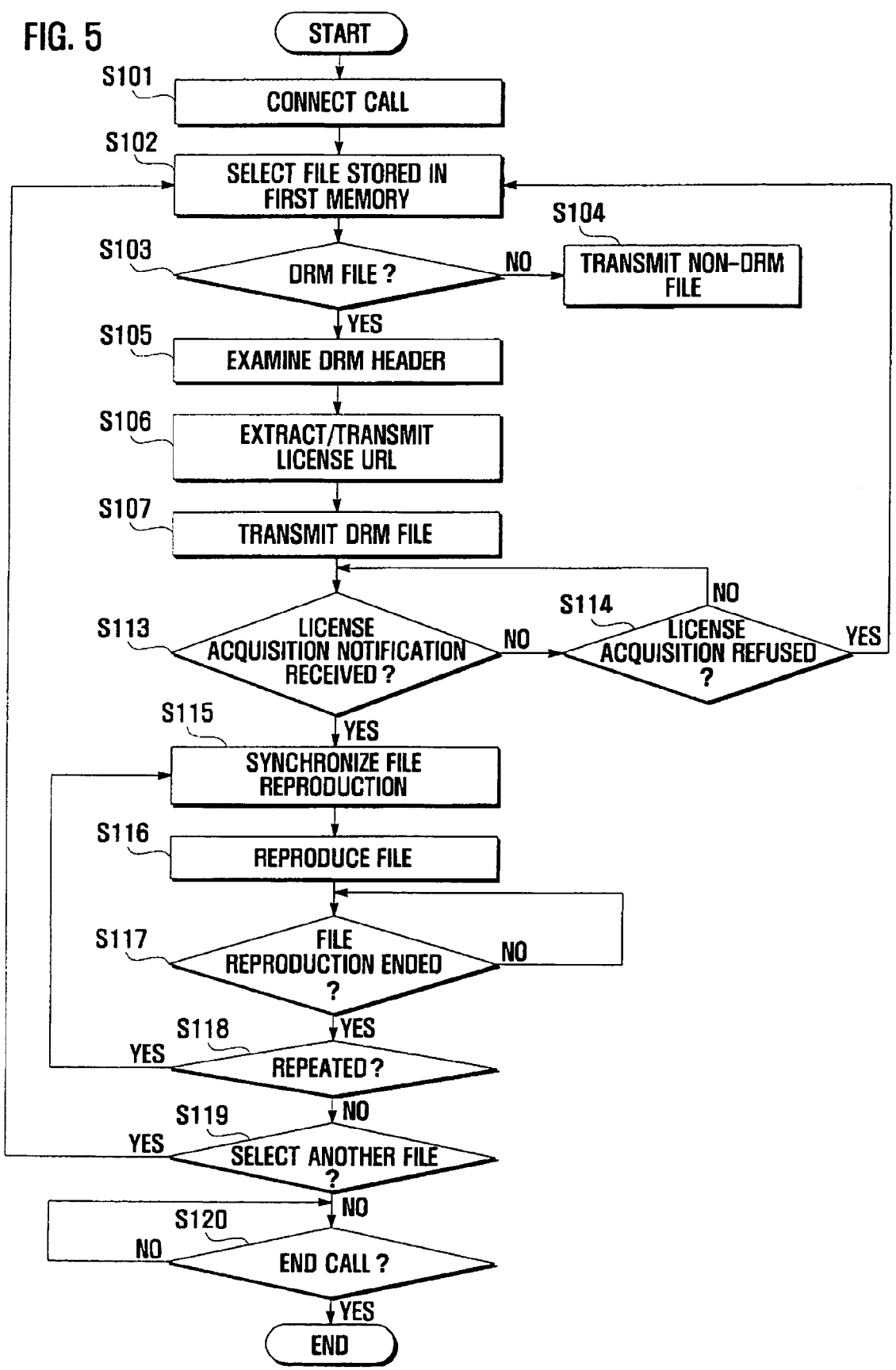
FIG. 5 is a flowchart illustrating a method of operating a transmitting terminal according to a first embodiment of the present invention.
Figure 6:
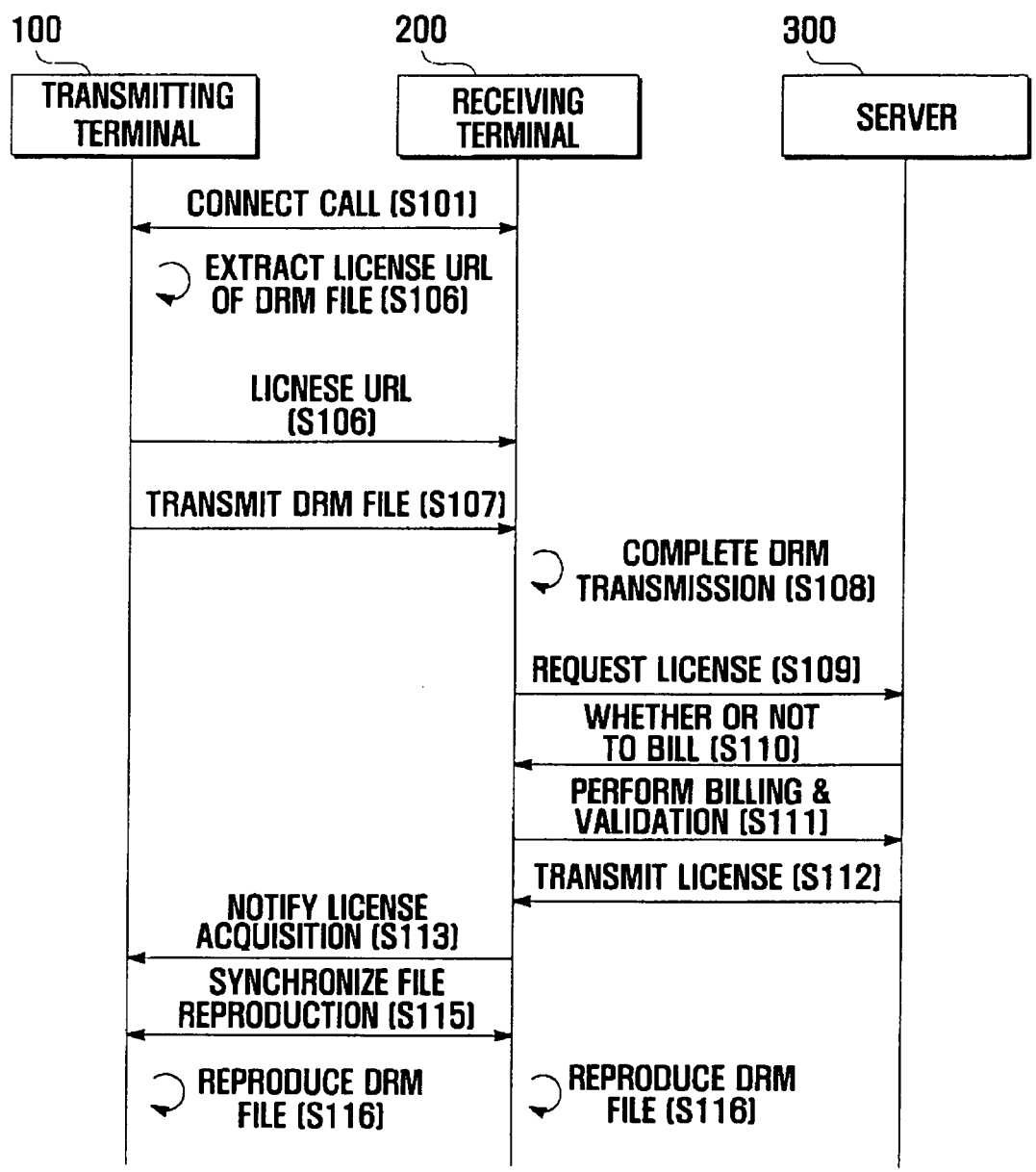
FIG. 6 is a signal flow diagram illustrating the signal flow between respective constituent elements of a system for sharing a DRM file between portable terminals according to a first embodiment of the present invention.

FIG. 5 illustrates an operating method of a transmitting terminal, as a part of a method of sharing a DRM file between portable terminals according to a first embodiment of the present invention, and FIG. 6 illustrates the signal flow between respective constituent elements of a system for sharing a DRM file between portable terminals according to a first embodiment of the present invention.

Referring to FIGS. 5 and 6, the DRM file sharing method according to the first embodiment of the present invention begins with a step in which the transmitting terminal 100 attempts a call connection with the receiving terminal 200, and establishes a communication channel (S101).

In step S101, the transmitting terminal 100 establishes a communication channel according to any one of video and voice calls. More specially, when the transmitting terminal 100 connects a voice call with the receiving terminal 200, it establishes a voice traffic channel by performing call setup corresponding to the voice call. In contrast with this, when the transmitting terminal 100 connects a video call with the receiving terminal 200, it establishes a communication channel based on video call setup necessary for a video call connection, for example, H.323 and H0.324H protocols.

Next, the transmitting terminal 100 selects a file stored in the first memory 170 (S102). The file may include a DRM file and a general copyright-free file.

Next, the transmitting terminal 100 checks if DRM technology is applied to the selected file (S103). If the selected file is a general copyright-free file to which DRM technology is not applied, the transmitting terminal 100 encodes the corresponding file and transmits the encoded file to the receiving terminal 200 (S104).

However, if a result of the check in step S1103 shows that the file is a DRM file, the transmitting terminal 100 examines the header of the DRM file DRM_F (S105), extracts a license URL from the header of the DRM file DRM_F, then transmits the extracted license URL to the receiving terminal 200 (S106).

In steps S105 and S106, the first control unit 160 of the transmitting terminal 100 creates a message for transmitting the license URL among diverse information contained in the header of the DRM file DRM_F to the receiving terminal 200, that is, license information L_Info. Further, the first control unit 160 controls the license information L_Info to be transmitted to the receiving terminal 200.

Next, the transmitting terminal 100 conveys the DRM file DRM_F stored in the first memory 170 to the receiving terminal 200 (S107).

In step S107, when a voice call connection with the receiving terminal 200 is being made, the transmitting terminal 100 may separately establish a communication channel for data transmission and transmit the DRM file DRM_F over the communication channel in order to convey the DRM file DRM_F stored in the first memory 170 to the receiving terminal 200. Further, when a video call connection with the receiving terminal 200 is being made, the transmitting terminal 100 may convey the DRM file DRM_F to the receiving terminal 200 by using a communication channel that is established for the video call.

Next, the receiving terminal 200 checks if the transmitting terminal 100 has completed transmitting the DRM file DRM_F (S108). Then, the receiving terminal 200 accesses the server 300 by using the license URL included in the license information L_Info transmitted by the transmitting terminal 100, and transmits a license request DRM_L_Q signal to the server 300 (S109). Further, as the server 300 requests the receiving terminal 200 to confirm whether or not to receive a bill for payment (S110), the receiving terminal 200 performs a billing and validation procedure for acquiring a license DRM_L (S111). If the bill settlement with the receiving terminal 200 is completed, the server 300 transmits the license DRM_L to the receiving terminal 200 (S112).

In step S109, the receiving terminal 200 may perform the process of acquiring the license DRM_L from the server 300, regardless of in what order the transmitting terminal 100 transmits the DRM file DRM_F. That is, the receiving terminal 200 may access the server 300 and perform a series of procedures for acquiring the license DRM_L corresponding to the DRM file DRM_F after it receives the license information L_Info from the transmitting terminal 100, or may perform a series of procedures for acquiring the license DRM_L corresponding to the DRM file DRM_F after the transmitting terminal 100 transmits the DRM file DRM_F.

In steps S110 and S111, the receiving terminal 200 may pay the bill for acquiring the license DRM_L by using various payment schemes, alone or in combination, such as payment with a portable terminal through portable terminal validation, payment with an to already-registered credit card through credit card validation, payment with cash, payment with available points authenticated by the server, payment with a gift certificate, etc.

After the receiving terminal 200 acquires the license DRM_L, the transmitting terminal 100 checks if it receives a notification of license acquisition from the receiving terminal 200 (S113).

When the transmitting terminal 100 receives the notification of license acquisition from the receiving terminal 200, it performs a process of synchronizing a file reproduction with the receiving terminal 200 (S115) and then reproduces the DRM file DRM_F (S116).

In steps S115 and S116, the transmitting and receiving terminals 100 and 200 perform the process of synchronizing a file reproduction so that the DRM files DRM_F to be reproduced in the respective terminals can be synchronously reproduced.

Meanwhile, in step S113, when the transmitting terminal 100 receives a signal indicative of a refusal to acquire the license, instead of the notification of license acquisition, from the receiving terminal 200 (S114), it may return to step S102 and select another file stored in the first memory 170. Here, when the transmitting terminal 100 returns to step S102 via step S104 due to the receiving terminal's refusal, it may transmit a file selected by a user to the receiving terminal 200, but may also encode a non-DRM file as a default and transmit the encoded non-DRM file to the receiving terminal 200.

Next, the first control unit 160 checks if the reproduction of the DRM file DRM_F has been completed (S117). If the reproduction of the DRM file DRM_F has been completed, the first control unit 160 returns to step S115 in which the process of synchronizing a file reproduction with the receiving terminal 200 is performed or proceeds to a step of checking if it selects another file (S119), according to whether or not the DRM file DRM_F is repeated (S118). In step S119, when the transmitting terminal 100 is to select another file, it returns to step S102. However, when the transmitting terminal 100 does not select another file, it checks whether or not to end the current call, without any separate operation (S120).

In the aforementioned DRM file sharing method according to the first embodiment of the present invention, a DRM file DRM_F already stored in the transmitting terminal 100 is transmitted to the receiving terminal 200, and the receiving terminal 200 acquires a license necessary for reproducing the DRM file DRM_F from the server 300, so that the transmitting and receiving terminals 100, 200 can reproduce the same DRM file DRM_F and thus share the use of the corresponding file. In the case where such a DRM file DRM_F is a music file, the same background music can be heard. Further, in the case of such a DRM file DRM_F is am image file, the same image file can be shared as a main or background screen.

Figure 7:
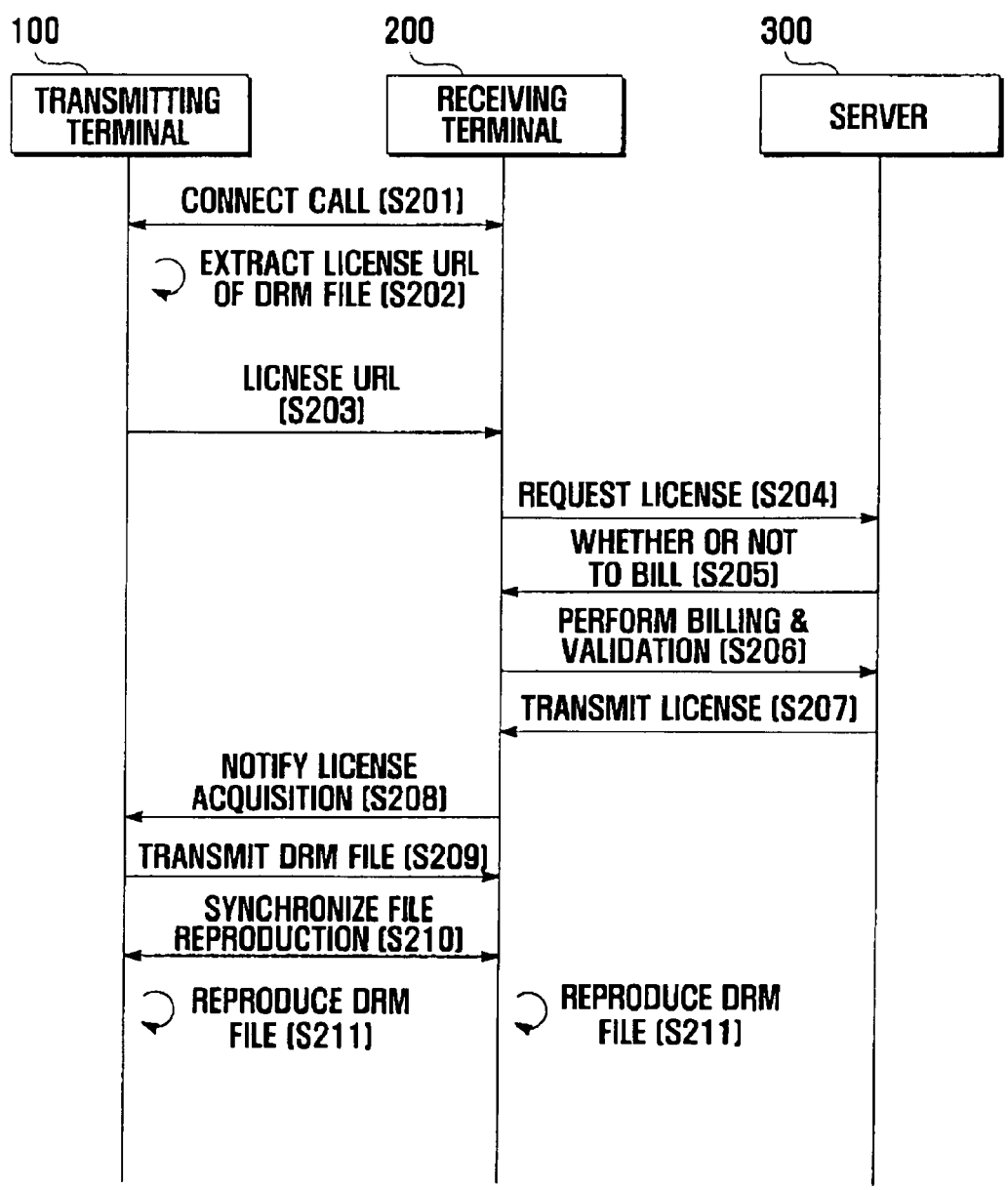
FIG. 7 is a signal flow diagram illustrating the signal flow between respective constituent elements of a system for sharing a DRM file between portable terminals according to a second embodiment of the present invention.

FIG. 7 illustrates the signal flow between respective constituent elements of a system for sharing a DRM file between portable terminals according to a second embodiment of the present invention.

Referring to FIG. 7, the DRM file sharing method according to the second embodiment of the present invention begins with a step in which the transmitting terminal 100 attempts a call connection with the receiving terminal 200, and establishes a communication channel (S201).

In step S201, the transmitting terminal 100 establishes a communication channel according to any one of video and voice calls. That is, the transmitting terminal 100 performs a call setup procedure according to a voice call connection or a video call setup procedure according to a video call connection.

Next, the transmitting terminal 100 examines the header of a DRM file DRM_F that a user selects from among files stored in the first memory 170, and extracts a license URL from the header (S202).

In step S202, the license URL is information necessary for acquiring a license of the DRM file DRM_F from the server 300.

Next, the transmitting terminal 100 creates license information L_Info in the firm of a message by using the license URL extracted from the header, and transmits the created license information L_Info to the receiving terminal 200 (S203).

Subsequently, upon receiving the license information L_Info, the receiving terminal 200 performs a series of processes with the server 300 in order to acquire a license DRM_L necessary for reproducing the DRM file DRM_F. That is, the receiving terminal 200 transmits a license request DRM_L_Q signal to the server 300 (S204). Thereupon, the server 300 requests the receiving terminal 200 to confirm whether or not to receive a bill for payment, which is required to acquire the license DRM_L (S205). In response to this request from the server 300, the receiving terminal 200 performs a billing and validation procedure (S206), and the server 300 transmits the license DRM_L to the receiving terminal 200 (S207).

In steps S205 and S206, the receiving terminal 200 may pay the bill for acquiring the license DRM_L to the server 300 by using various payment schemes, such as payment with a portable terminal, payment with a credit card, payment with cash, payment with available points, payment with a gift certificate, etc.

When the receiving terminal 200 has completed receiving the license DRM_L from the server 300, it notifies the transmitting terminal 100 of acquiring the license DRM_L (S208). Thereupon, the transmitting terminal 100 transmits a DRM file DRM_F corresponding to the license DRM_L to the receiving terminal 200 (S209).

In step S209, when the transmitting terminal 100 has completed transmitting the DRM file DRM_F or the receiving terminal 200 has completed receiving the DRM file DRM_F, the transmitting terminal 100 performs a process of synchronizing file reproduction in order to reproduce the DRM file DRM_F in synchronization with the receiving terminal 200 (S210). Therefore, the transmitting and receiving terminals 100 and 200 reproduce the same DRM file, respectively (S211).

In the aforementioned DRM file sharing method according to the second embodiment of the present invention, the transmitting terminal 100 transmits a DRM file DRM_F after the receiving terminal 200 secures a license DRM_L corresponding to the DRM file DRM_F, so that procedures to be performed when the receiving terminal 200 does not secure the license DRM_L can be reduced.

That is, in the DRM file sharing method according to the second embodiment of the present invention, when the receiving terminal 200 does not want to share a DRM file DRM_F, that is, when the receiving terminal 200 notifies the transmitting terminal 100 of its intention to refuse the license acquisition, the transmitting terminal 100 may immediately transmit a non-DRM file set as a default to the receiving terminal 200 or select another file stored in the first memory 170, as in the DRM file sharing method according to the first embodiment of the present invention.

Figure 8:
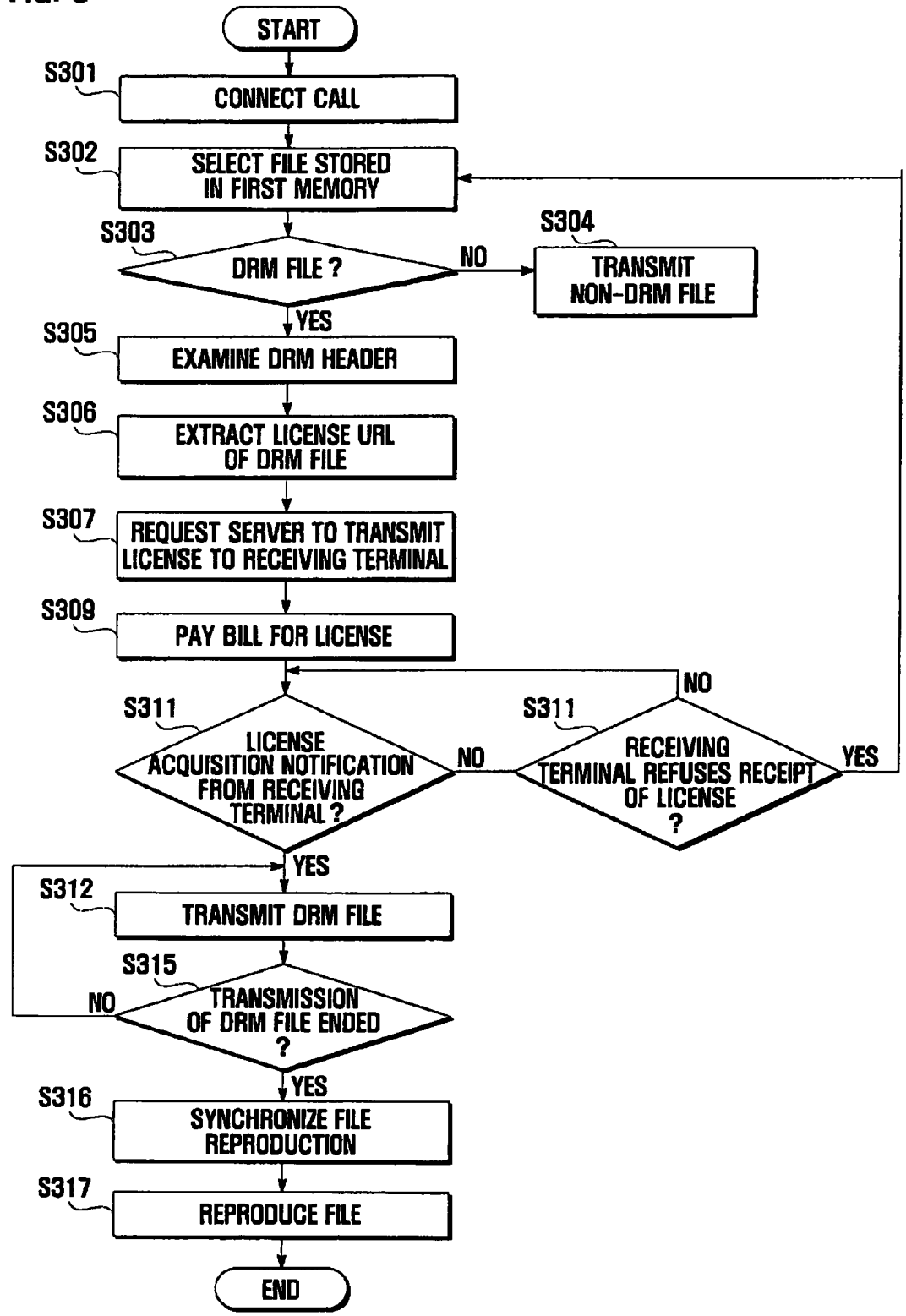
FIG. 8 is a flowchart illustrating a method of operating a transmitting terminal according to a third embodiment of the present invention.
Figure 9:
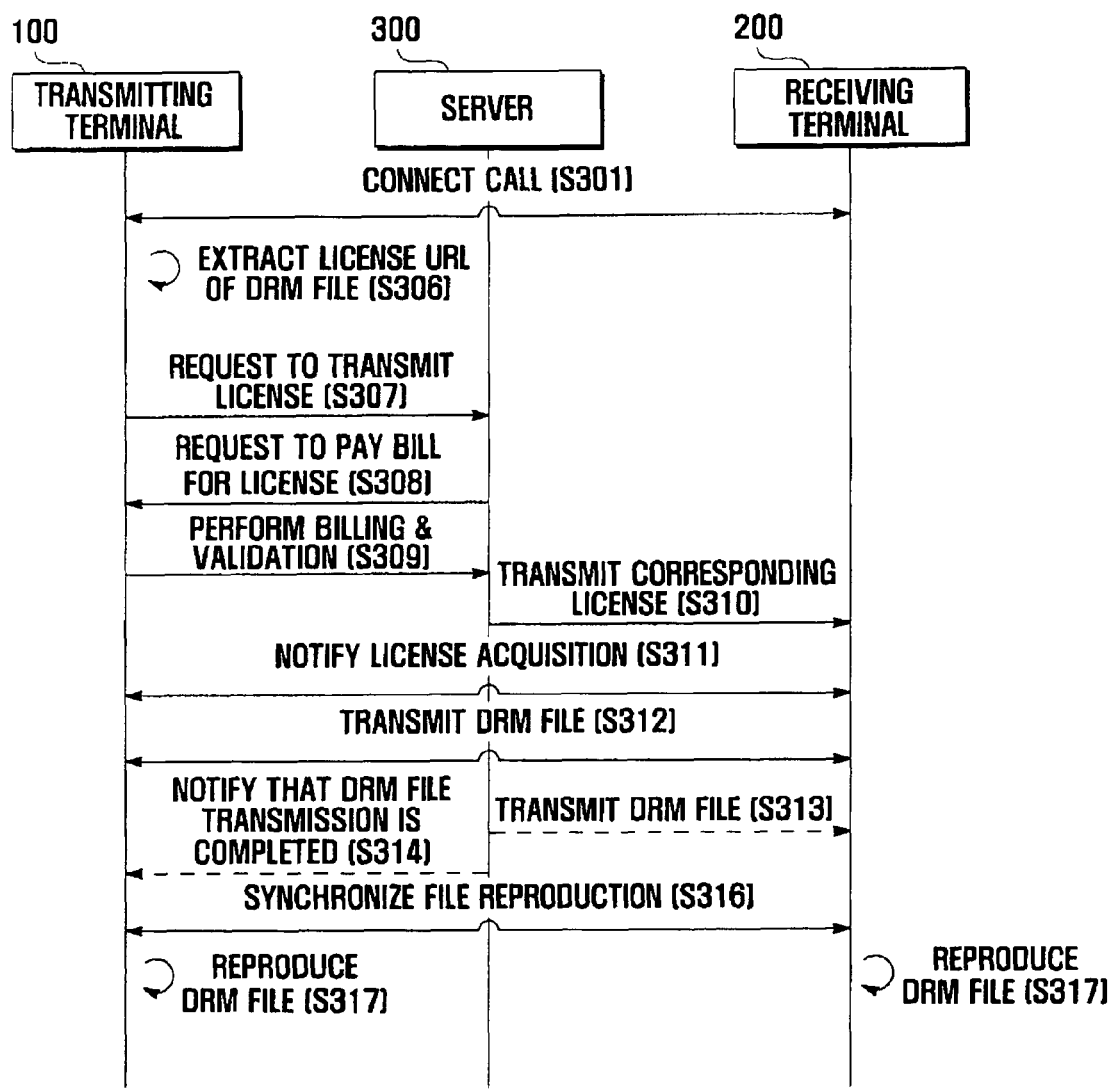
FIG. 9 is a signal flow diagram illustrating the signal flow between respective constituent elements of a system for sharing a DRM file between portable terminals according to a third embodiment of the present invention.

FIG. 8 illustrates an operating method of a transmitting terminal, as a part of a method of sharing a DRM file between portable terminals according to a third embodiment of the present invention, and FIG. 9 illustrates signal flow between respective constituent elements of a system for sharing a DRM file between portable terminals according to a third embodiment of the present invention.

Referring to FIGS. 8 and 9, the DRM file sharing method according to the third embodiment of the present invention begins with a step in which the transmitting terminal 100 attempts a call connection with the receiving terminal 200, and establishes a traffic channel (S301).

In step S301, the traffic channel may be a traffic channel according to any one of video and voice calls.

Next, the transmitting terminal 100 selects any one of files stored in the first memory 170 (S302), and checks if DRM technology is applied to the selected file (S303).

In step 303, if the selected file is a non-DRM file to which DRM technology is not applied, that is, a file distributable without copyright, the transmitting terminal 100 encodes the corresponding file and transmits the encoded file to the receiving terminal 200 (S304).

In step S304, when a voice call is connected with the receiving terminal 200, the transmitting terminal 100 may separately establish a data channel and transmit the file over the data channel. Further, when a video call is connected with the receiving terminal 200, the transmitting terminal 100 may transmit the file by using the channel over which the vide call with the receiving terminal 200 is being made.

However, if a result of the check in step S303 shows that the file is a DRM file, the transmitting terminal 100 examines the header of the DRM file DRM_F (S305), and extracts a license URL from the header (S306).

In steps S305 and S306, the transmitting terminal 100 may access the server 300 by using the extracted license URL, and specify a license DRM_L to use rights for the DRM file DRM_F.

Next, the transmitting terminal 100 accesses the server 300 based on the extracted license URL, specifies a license DRM_L corresponding to the license URL, and then requests the server 300 to transmit the specified license DRM_L to the receiving terminal 200 (S307).

Thereupon, the server 300 requests the transmitting terminal 100 to pay a bill for the license DRM_L (S308), and the transmitting terminal 100 pays the bill through billing and validation (S309).

In steps S308 and S309, various payment schemes, such as portable terminal payment, credit card payment, cash payment, point payment, etc., may be used for bill payment.

Next, if bill payment is completed in step S309, the server 300 transmits the license DRM_L, requested by the transmitting terminal 100, to the receiving terminal 200 (S310).

When the receiving terminal 200 receives the license DRM_L, it notifies the transmitting terminal 100 of acquiring the license DRM_L (S311). Upon confirming that the receiving terminal 200 has acquired the license DRM_L, the transmitting terminal 100 transmits a DRM file DRM_F corresponding to the license DRM_L to the receiving terminal 200 (S312).

In step S311, the receiving terminal 200 may put a veto on receiving the license DRM_L. In this case, the server 300 may notifies the transmitting terminal 100 of putting the receiving terminal's veto on the receipt of the license DRM_L.

Meanwhile, before the transmitting terminal 100 pays the bill for the license DRM_μL, it may verify through the server 300 whether or not the receiving terminal 200 receives the license DRM_L. That is, at the request of the transmitting terminal 100, the server 300 may check if the receiving terminal 200 receives a license DRM_L for a specific DRM file DRM_F, by using a messaging service, etc. If the receiving terminal 200 accepts the receipt of the license DRM_L, the server notifies the transmitting terminal 100 of this, and the transmitting terminal 100 pays a bill for the license DRM_L. In contrast with this, when the receiving terminal 200 refuses the receipt of the license DRM_L, the server 300 notifies the transmitting terminal 100 of this, and based on this, the transmitting terminal may determine whether or not to purchase the license DRM_L.

In addition, the server 300 may transmit the DRM file DRM_F corresponding to the license DRM_L to the receiving terminal 200, in substitute for the transmitting terminal 100 (S313), and thus notify the transmitting terminal 100 of completing the transmission of the DRM file DRM_F (S314).

Next, according to whether or not to complete the transmission and receipt of the DRM file DRM_F (S315), the transmitting terminal 100 performs a procedure of synchronizing file reproduction with the receiving terminal 200 (S316), and the transmitting and receiving terminals 100, 200 reproduce the DRM file DRM_F, respectively after the synchronization procedure has been completed (S317).

In step S311, the transmitting terminal 100 may check if the receiving terminal 200 refuses the receipt of the license DRM_L (S318). When the receiving terminal 200 in refuses the receipt of the license DRM_L, the transmitting terminal may return to step S302 and select another file. Further, in step S318, when the receiving terminal 200 does not refuse the receipt of the license DRM_L, the transmitting terminal may wait for a certain time so as to receive a notification from the receiving terminal 200.

In the aforementioned DRM file sharing method according to the third embodiment of the present invention, the transmitting terminal purchases a license DRM_L defining a reproduction right for a DRM file DRM_F and conveys the purchased license to the receiving terminal, so that the receiving terminal 200 can ease the purchase burden according to the receipt of the DRM file, and thus DRM sharing can be more smoothly implemented.

Subsequently, when the transmitting and receiving terminals perform a DRM file sharing procedure for the same DRM file as that having been previously shared by them, the receiving terminal may retrieve the DRM file stored in the second memory, based on license information which the transmitting terminal transmits to the receiving terminal in order to request DRM file reproduction, and then reproduce the DRM file in synchronization with the transmitting terminal.

As used herein, the "unit" or "module" refers to a software element or a hardware element, such as a Field Programmable Gate Array (FPGA) or an Application Specific Integrated Circuit (ASIC), which performs a predetermined function. However, the unit or module does not always have a meaning limited to software or hardware. The module may be constructed either to be stored in an addressable storage medium or to execute one or more processors. Therefore, the module includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the modules may be either combined into a smaller number of elements or modules or divided into a larger number of elements or modules.

In the method and system for sharing a DRM file between portable terminals according to the present invention as described above, transmitting and receiving terminals acquire a DRM file and a license for reproducing the DRM file respectively, and synchronously reproduce the DRM file, which makes it possible to share a specific DRM file.

The effects of the present invention are not limited to the above-mentioned effects, and other effects not mentioned above can be clearly understood from the definitions in the claims by one skilled in the art.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the embodiments described above should be understood as illustrative not restrictive in all aspects. The present invention is defined only by the scope of the appended claims and must be construed as including the meaning and scope of the claims, and all changes and modifications derived from equivalent concepts of the claims.

What is claimed is:

1. A method of sharing a DRM (Digital Rights Management) file between portable terminals, the method comprising:
   extracting a license uniform resource locator (URL) of the DRM; and
   transmitting a license information to a receiving terminal by a transmitting terminal; the license information comprising an indication of the license URL;
   transmitting the DRM file from the transmitting terminal to the receiving terminal;
   receiving a notification at the transmitting terminal by the receiving terminal that the receiving terminal has acquired the license for the DRM file;
   reproducing the DRM file by the transmitting terminal in synchronization with the receiving terminal, said reproducing comprising at least one of:
   (i) outputting audio associated with the DRM file as a background to the communications session between the transmitting terminal and the receiving terminal,
   (ii) displaying video associated with the DRM file as a background to the communications sessions between the transmitting terminal and the receiving terminal,
   wherein the communications session includes one of a video call and a voice call,
   wherein the license information is transmitted while the communications session is being established.

2. The method of claim 1, wherein the DRM file is reproduced in synchronization after the transmission of the DRM file is completed.

3. The method of claim 1, wherein the transmitting terminal establishes a channel for a voice call with the receiving terminal or establishes a channel for a video call with the receiving terminal.

4. The method of claim 3, wherein, when the transmitting terminal establishes the channel for the voice call with the receiving terminal, and the transmitting of the license information to the receiving terminal comprises:
   establishing a data channel between the transmitting and receiving terminals; and
   transmitting the license information to the receiving terminal over the data channel.

5. The method of claim 1, wherein the DRM file is reproduced by the transmitting terminal in synchronization with the receiving terminal after the DRM file is transmitted.

6. A system for sharing a DRM (Digital Rights Management) file between portable terminals, the system comprising:
   a transmitting terminal engaged in a call with a receiving terminal, wherein:
   the transmitting terminal is configured to:
      extract a license uniform resource locator (URL) from an already stored DRM file to which DRM technology is applied,
      transmit an indication of the license URL to the receiving terminal,
      selectively transmit the DRM file from the transmitting terminal to the receiving terminal, and
      receive a notification that the receiving terminal has acquired the license for the DRM file;
      reproduce the DRM file as a background to the call; and
   the receiving terminal is configured to:
      receive the license URL from the transmitting terminal;
      acquire a license defining a reproduction right for the DRM file based on the received license URL;
      receive the DRM file from the transmitting terminal,
      send the notification to the transmitting terminal that the receiving terminal has acquired the license for the DRM file; and
      reproduce, as a background to the call, the DRM file in synchronization with the transmitting terminal, said reproducing comprising at least one of simultaneously outputting audio associated with the DRM file and simultaneously displaying video associated with the DRM file at both the transmitting and the receiving terminals,
   wherein the license URL is transmitted while the call is being established.

7. The system of claim 6, further comprising a server configured to transmit the license defining the reproduction right for the DRM file to the receiving terminal.

8. The system of claim 6, further comprising a server configured to transmit the DRM file and the license defining the reproduction right for the DRM file to the receiving terminal.

9. The system of claim 8, DRM file is reproduced in synchronization after the transmission of the DRM file is completed.

10. The system of claim 6, wherein the connected call is established by one of a voice call connection and a video call connection, wherein the transmitting terminal establishes a data channel with the receiving terminal and transmits at least one of the DRM file and the license URL over the data channel when the voice call connection with the receiving terminal is being established, and the transmitting terminal transmits at least one of the DRM file and the license URL over a channel for a video call when the video call connection with the receiving terminal is being established.

* * * * *